United States Patent
Jin

(10) Patent No.: US 10,698,635 B2
(45) Date of Patent: Jun. 30, 2020

(54) MEMORY DEVICE AND OPERATING METHOD CAPABLE OF STORING DATA IN A PLURALITY OF NAME SPACES

(71) Applicant: SK hynix Inc., Gyeonggi-do (KR)

(72) Inventor: Yong Jin, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 3 days.

(21) Appl. No.: 16/142,146

(22) Filed: Sep. 26, 2018

(65) Prior Publication Data
US 2019/0272118 A1 Sep. 5, 2019

(30) Foreign Application Priority Data
Mar. 5, 2018 (KR) .................. 10-2018-0025931

(51) Int. Cl.
*G06F 3/06* (2006.01)
*G06F 12/10* (2016.01)

(52) U.S. Cl.
CPC .......... *G06F 3/0659* (2013.01); *G06F 3/0604* (2013.01); *G06F 3/064* (2013.01); *G06F 3/0679* (2013.01); *G06F 12/10* (2013.01); *G06F 2212/1044* (2013.01); *G06F 2212/7201* (2013.01)

(58) Field of Classification Search
CPC ...... G06F 3/0679; G06F 3/0604; G06F 3/064; G06F 12/10; G06F 3/0659
USPC .................................................. 711/103, 162
See application file for complete search history.

(56) References Cited

U.S. PATENT DOCUMENTS

| | | | | |
|---|---|---|---|---|
| 10,579,272 | B2* | 3/2020 | Tremblay | H04L 67/1097 |
| 2015/0347402 | A1* | 12/2015 | McKinion | G06F 16/188 |
| | | | | 707/827 |
| 2016/0034201 | A1* | 2/2016 | Chambliss | G06F 3/0608 |
| | | | | 711/159 |
| 2017/0315875 | A1* | 11/2017 | Tirupati Nagaraj | ......................... |
| | | | | G06F 11/1453 |
| 2018/0074724 | A1* | 3/2018 | Tremblay | G06F 3/0689 |
| 2018/0088805 | A1* | 3/2018 | Kanno | G06F 3/065 |
| 2018/0349285 | A1* | 12/2018 | Ish | G06F 12/0246 |

FOREIGN PATENT DOCUMENTS

| | | |
|---|---|---|
| KR | 1020170013697 | 2/2017 |
| KR | 1020170056413 | 5/2017 |

* cited by examiner

*Primary Examiner* — Tuan V Thai
*Assistant Examiner* — Edward Waddy, Jr.
(74) *Attorney, Agent, or Firm* — IP & T Group LLP

(57) ABSTRACT

There are provided a memory system and an operating method thereof. The memory system includes: a memory device divided into a plurality of name spaces; and a controller for controlling a program operation of the memory device in response to a write command, wherein the controller generates at least one data set based on input data, and controls the memory device to program the at least one data set in a select name space of the plurality of name spaces based on meta data included in the at least one data set.

18 Claims, 9 Drawing Sheets

FIG. 9
(a)
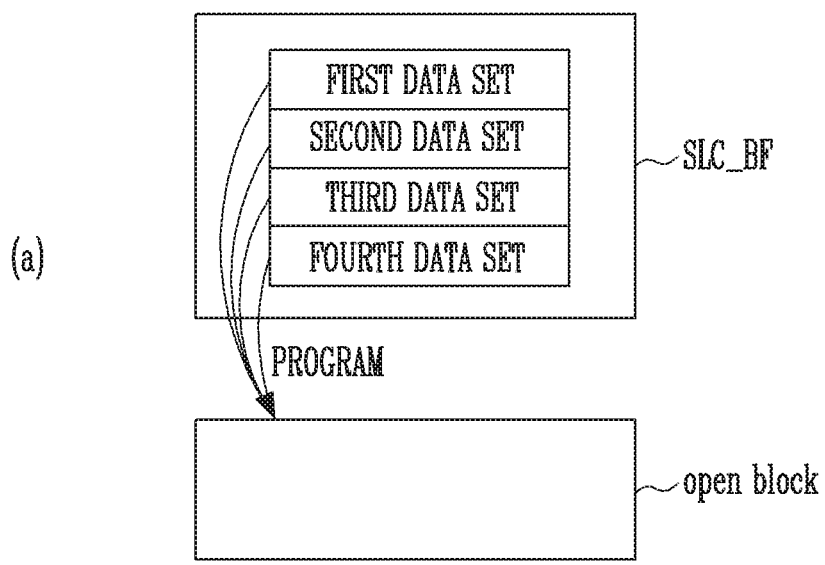
(b)
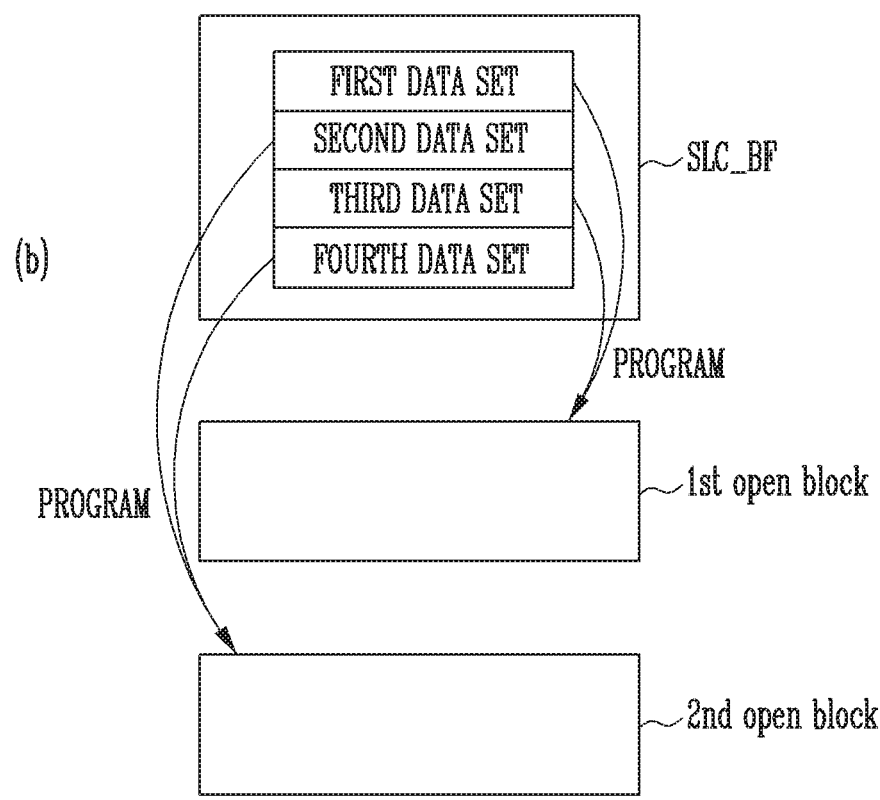

MEMORY DEVICE AND OPERATING METHOD CAPABLE OF STORING DATA IN A PLURALITY OF NAME SPACES

CROSS-REFERENCE TO RELATED APPLICATION

The present application claims priority under 35 U.S.C. § 119(a) to Korean patent application number 10-2018-0025931, filed on Mar. 5, 2018, which is incorporated herein by reference in its entirety.

BACKGROUND

1. Field of Invention

The present disclosure generally relates to a memory system and an operating method thereof, and more particularly, to a memory system capable of storing data in a plurality of areas and an operating method of the memory system.

2. Description of Related Art

The paradigm on recent computer environment has shifted to ubiquitous computing in which computing systems can be used anywhere and anytime. This promotes increasing usage of portable electronic devices such as mobile phones, digital cameras, notebook computers, and the like. Such portable electronic devices may generally include a memory system using a memory device, i.e., a data storage device. The data storage device is used as a main memory device or an auxiliary memory device of the portable electronic devices.

A data storage device using a memory device has excellent stability and durability, high information access speed, and low power consumption, since there is no mechanical driving part. In examples of memory systems having such advantages, the data storage device includes a Universal Serial Bus (USB) memory device, memory cards having various interfaces, a Solid State Drive (SSD), and the like.

SUMMARY

Embodiments provide a memory system for storing data having different characteristics in different open blocks when data received from a host are stored in a plurality of areas, and an operating method of the memory system.

According to an aspect of the present disclosure, there is provided a memory system including: a memory device divided into a plurality of name spaces; and a controller configured to control a program operation of the memory device in response to a write command, wherein the controller generates at least one data set based on input data, and controls the memory device to program the at least one data set in a select name space of the plurality of name spaces based on meta data included in the at least one data set.

According to another aspect of the present disclosure, there is provided a memory system including: a memory device divided into a plurality of name spaces; and a controller configured to generate a plurality of data sets based on input data, and control the memory device to store the plurality of data sets in the plurality of name spaces, wherein the controller controls the memory device to store the plurality of data sets in the plurality of name spaces based on meta data including identity (ID) information associating each of the data sets with one of the name spaces.

According to still another aspect of the present disclosure, there is provided a method for operating a memory system, the method including: receiving a write command and a plurality of data from a host; generating a plurality of data sets based on the plurality of data, wherein each of the plurality of data sets includes meta data; distinguishing the plurality of data sets with respect to a plurality of name spaces of a memory device using the meta data; and storing the plurality of data sets in the plurality of name spaces based on the distinguishing operation.

According to an aspect of the present disclosure, there is provided a memory system including: a memory device including a plurality of memory blocks having a plurality of space areas based on logical pages; and a controller configured to: receive a plurality of user data in response to a write command, generate a plurality of data sets, each including user data and identity (ID) information indicating a corresponding space area for the corresponding user data, and control the memory device to receive the plurality of data sets, and program each of the data sets in the corresponding space area based on the ID information.

BRIEF DESCRIPTION OF THE DRAWINGS

Various embodiments will now be described more fully with reference to the accompanying drawings; however, elements and features of the present disclosure may be configured or arranged differently than shown and described herein. Thus, the present invention is not limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Also, throughout the specification, reference to "an embodiment," "another embodiment," or the like is not necessarily to only one embodiment, and different references to any such phrase are not necessarily to the same embodiment(s).

FIG. 9 is a diagram illustrating an operation of programming a data set from a buffer, e.g., an SLC buffer, to an open block in a memory system according to an embodiment of the present disclosure.

DETAILED DESCRIPTION

In the following detailed description, certain embodiments of the present disclosure have been shown and described, simply by way of example. As those skilled in the art would realize, the described embodiments may be modified in various different ways, all without departing from the spirit or scope of the present disclosure. Accordingly, the drawings and description are to be regarded as illustrative in nature and not restrictive.

In the entire specification, when an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include one or more other components rather than excluding such other component(s), unless the context indicates otherwise.

Figure 1:
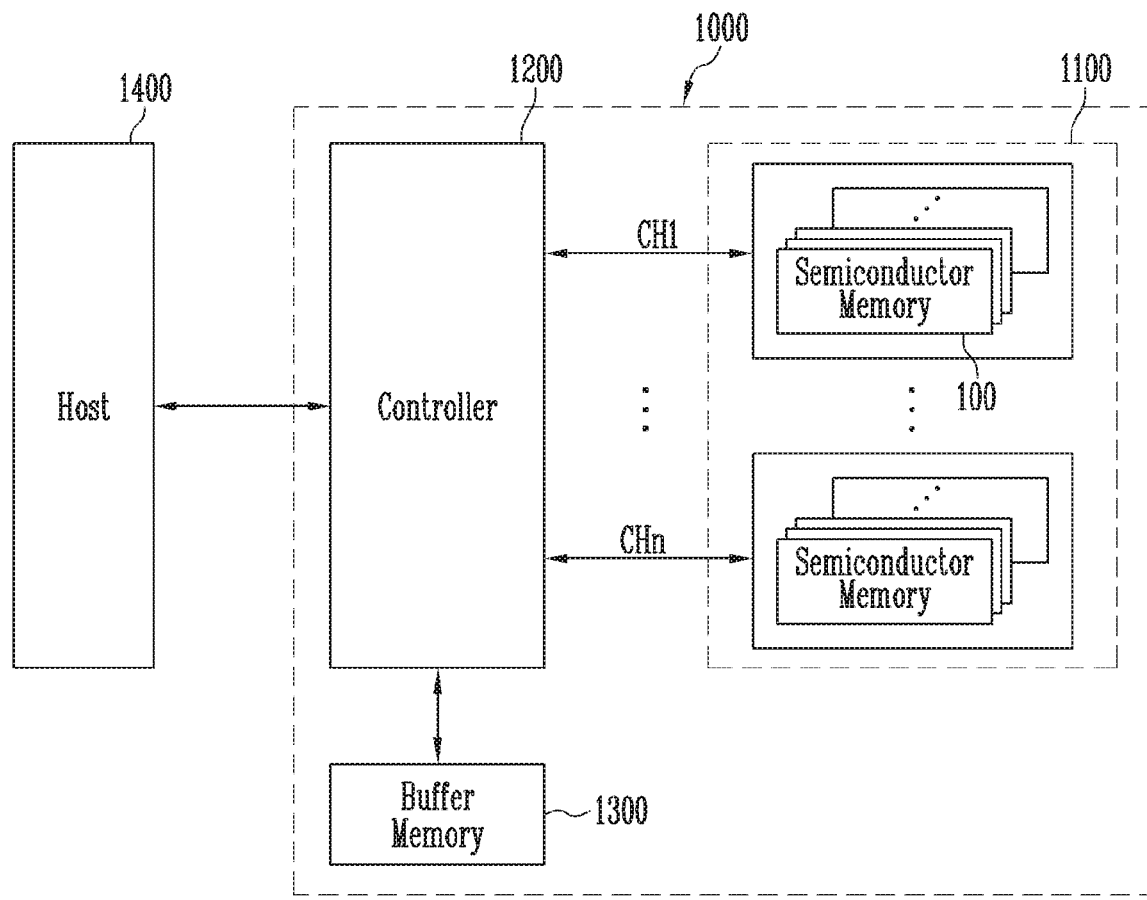
FIG. 1 is a block diagram illustrating a memory system according to an embodiment of the present disclosure.

FIG. 1 is a block diagram illustrating a memory system according to an embodiment of the present disclosure.

Referring to FIG. 1, the memory system 1000 may include a memory device 1100, a controller 1200, and a buffer memory 1300. The memory device 1100 may include a plurality of semiconductor memories 100. The plurality of semiconductor memories 100 may be divided into a plurality of groups.

The plurality of, e.g., n, groups may communicate with the controller 1200 respectively through first to nth channels CH1 to CHn. Each semiconductor memory 100 will be described later with reference to FIG. 4.

Each group may be configured to communicate with the controller 1200 through one common channel. The controller 1200 may be configured to control the memory device 1100, that is, the plurality of semiconductor memories 100 through the plurality of channels CH1 to CHn.

The controller 1200 may be coupled between a host 1400 and the memory device 1100. The controller 1200 may be configured to access the memory device 1100 in response to a command received from the host 1400. For example, the controller 1200 may be configured to control read, program, erase, and background operations of the memory device 1100 in response to a command received from the host 1400. The controller 1200 may be configured to provide an interface between the memory device 1100 and the host 1400. The controller 1200 may be configured to drive firmware for controlling the memory device 1100.

The controller 1200 may divide the memory device 1100 into a plurality of areas, e.g., name spaces, and manage the plurality of areas or name spaces. The name spaces may be areas obtained by dividing a storage space of the memory device 1100, based on logical addresses, e.g., Logical Block Addresses (LBAs). For example, in a configuration of LAB 1 to LAB 1000 addresses of the storage space of the memory device 1100, and the storage space divided into two name spaces (e.g., name space 0 and name space 1), the name space 0 may include an area corresponding to the LBA 1 to the LBA 500, and the name space 1 may include an area corresponding to the LBA 501 to the LBA 1000.

When a write command and a plurality of data are received from the host 1400, the controller 1200 may generate at least one data set according to LBAs of the plurality of data. Meta data included in a data set may include identity (ID) information of a name space in which data included in the data set are to be stored. The controller 1200 may control the memory device 1100 to distinguish data sets for each name space, based on meta data included in the data sets, and program the distinguished data sets.

The buffer memory 1300 may temporarily store data read from the memory device 1100 in a read operation and then output the data to the host 1400 in response to a request from the host 1400. Alternatively, the buffer memory 1300 may temporarily store data received from the host 1400 in a program operation and then output the data to the memory device 1100 in response to a request from the host 1400. The buffer memory 1300 may be a component separate from the controller 1200 as illustrated in FIG. 1, or alternatively the controller 1200 may be configured to include the buffer memory 1300.

The host 1400 may control the memory system 1000. The host 1400 may include portable electronic devices such as a computer, a personal digital assistant (PDA), a portable media player (PMP), an MP3 player, a camera, a camcorder, and a mobile phone. The host 1400 may request a program, read or erase operation of the memory system 1000 through a command.

The controller 1200 and the memory device 1100 may be integrated into a single semiconductor device. In an embodiment, the controller 1200 and the memory device 1100 may be integrated into a single semiconductor device to constitute a memory card such as a PC card (e.g., Personal Computer Memory Card International Association (PCM-CIA)), a Compact Hash (CF) card, a Smart Media Card (e.g., SM or SMC), a memory stick, a Multi-Media Card (e.g., MMC, RS-MMC or MMCmicro), an SD card (e.g., SD, miniSD, microSD or SDHC), or a Universal Hash Storage (UFS).

The controller 1200 and the memory device 1100 may be integrated into a single semiconductor device to constitute a semiconductor drive (e.g., Solid State Drive (SSD)). The semiconductor drive SSD may include a storage device configured to store data in a semiconductor memory. If the memory system 1000 is used as the semiconductor drive SSD, the operating speed of the host 1400 coupled to the memory system 1000 may be remarkably improved.

In another example, the memory system 1000 may be provided as one of various components of an electronic device such as a computer, an Ultra Mobile PC (UMPC), a workstation, a net-book, a Personal Digital Assistant (PDA), a portable computer, a web tablet, a wireless phone, a mobile phone, a smart phone, an e-book, a Portable Multi-Media Player (PMP), a portable game console, a navigation system, a black box, a digital camera, a 3-dimensional (3D) television, a digital audio recorder, a digital audio player, a digital picture recorder, a digital picture player, a digital video recorder, a digital video player, a device capable of transmitting and receiving information in a wireless environment, one of various electronic devices that constitute a home network, one of various electronic devices that constitute a computer network, one of various electronic devices that constitute a telematics network, an RFID device, or one of various components that constitute a computing system.

In an embodiment, the memory device 1100 or the memory system 1000 may be packaged in various forms such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), Plastic Metric Quad Flat Pack (PMQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi-Chip Package (MCP), Wafer-level Fabricated Package (WFP), or Wafer-level processed Stack Package (WSP).

Figure 2:
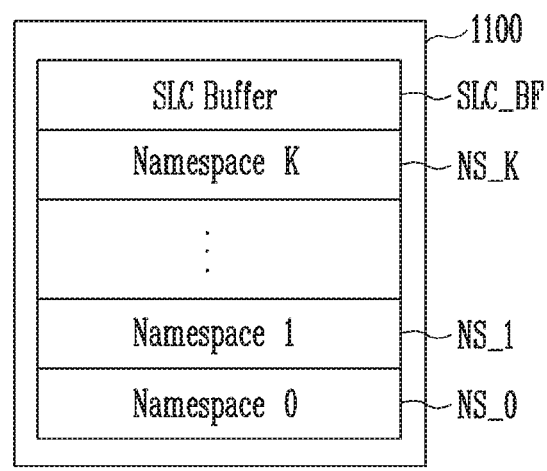
FIG. 2 is a block diagram illustrating spaces, e.g., name spaces, of a memory device according to an embodiment of the present disclosure.

FIG. 2 is a block diagram illustrating areas, e.g., name spaces, of a memory device, e.g., the memory device 1100 of FIG. 1, according to an embodiment of the present disclosure.

Referring to FIG. 2, the memory device 1100 may include an SLC buffer (SLC_BF) and a plurality of name spaces (e.g., Namespace 0 (NS_0) to Namespace K (NS_K)).

In a write operation, the SLC buffer may receive data received from the controller 1200 of FIG. 1 to be stored therein, and transmit the stored data to the plurality of name spaces (Namespace 0 to Namespace K). The SLC buffer may be implemented with single level cells (SLCs).

The memory device 1100 may include at least two name spaces. In various embodiments described herein, the memory device 1100 includes a plurality of name spaces NS_0 to NS_K, where K is an integer greater than 2. The plurality of name spaces NS_0 to NS_K may be areas obtained by dividing the storage space of the memory device 1100 based on LBAs. Memory cells included in each of the name spaces NS_0 to NS_K may be Multi-Level Cells (MLCs) or Triple Level Cells (TLCs), which can store data of two or more bits.

Figure 3:
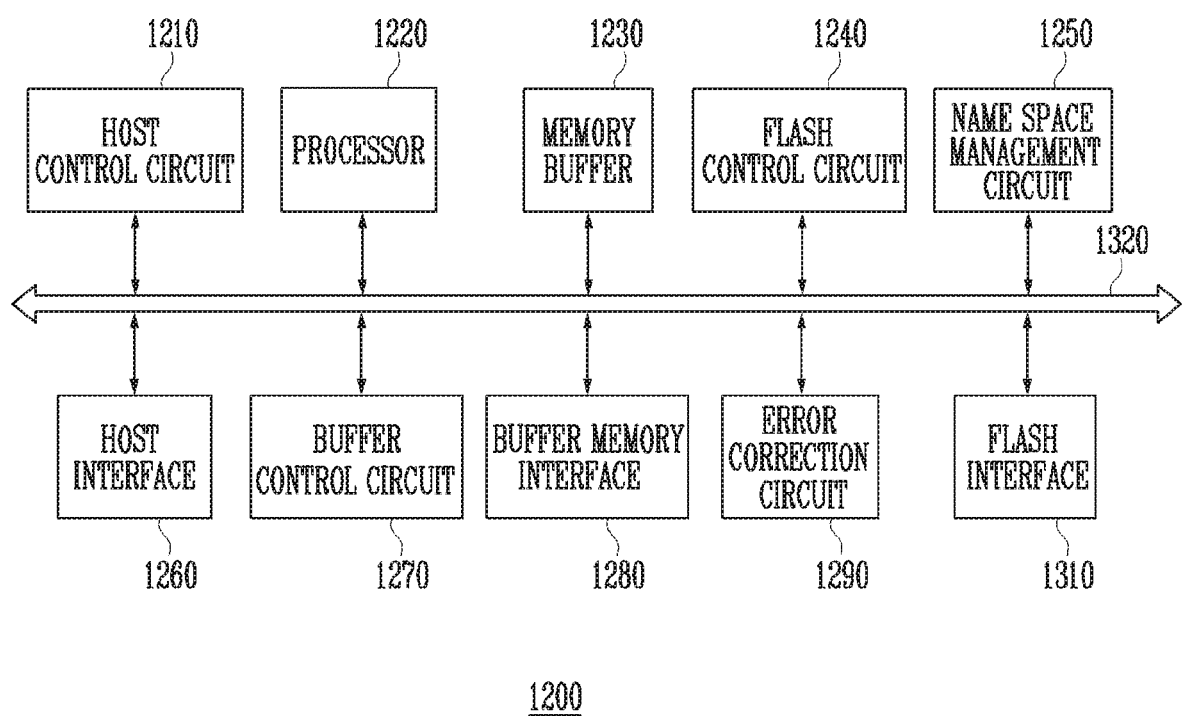
FIG. 3 is a block diagram illustrating a configuration of a controller according to an embodiment of the present disclosure.

FIG. 3 is a block diagram illustrating a controller, e.g., the controller 1200 of FIG. 1, according to an embodiment of the present disclosure.

Referring to FIG. 3, the controller 1200 may include a host control circuit 1210, a processor 1220, a memory buffer 1230, a flash control circuit 1240, a name space management circuit 1250, a host interface 1260, a buffer control circuit 1270, a buffer memory interface 1280, an error correction circuit 1290, a flash interface 1310, and a bus 1320.

The bus 1320 may be configured to provide channels between components of the controller 1200.

The host control circuit 1210 may control data transmission between the host 1400 of FIG. 1, and the host interface 1260. Also, the host control circuit 1210 may control data transmission between the host 1400 and a controller memory buffer, i.e., the memory buffer 1230 or the buffer memory 1300 of FIG. 1. In an example, the host control circuit 1210 may control an operation of buffering data received from the host 1400 directly to the memory buffer 1230 or to the buffer memory 1300 via the host interface 1260. In another example, the host control circuit 1210 may control an operation of outputting data buffered in the memory buffer 1230 or the buffer memory 1300 to the host 1400 via the host interface 1260.

The processor 1220 may control the overall operations of the controller 1200 including a logical operation. The processor 1220 may communicate with the host 1400 of FIG. 1 through the host interface 1260, and communicate with the memory device 1100 of FIG. 1 through the flash interface 1310. The processor 1220 may communicate with the buffer memory 1300 of FIG. 1 through the buffer memory interface 1280. The processor 1220 may control the memory buffer 1230 through the buffer control circuit 1270. The processor 1220 may control an operation of the memory system 1000 by using the memory buffer 1230 as a working memory, a cache memory or a buffer memory. The processor 1220 may drive firmware called a flash translation layer (hereinafter, referred to as 'FTL') to control the overall operations of the controller 1200. The FTL may be stored in the memory buffer 1230. When a write command, a plurality of data, and an address are received from the host 1400, the processor 1220 may generate at least one data set, using the plurality of data and the address. The processor 1220 may generate a data set including data storage information (e.g., meta data). In an example, the meta data may include map data newly updated and ID information of a name space corresponding to each data set. The map data is newly updated by checking map data corresponding to a command operation, e.g., first map data including Logical to Physical (L2P) information (hereinafter, referred to as 'logical information') and second map data including Physical to Logical (P2L) information (hereinafter, referred to as 'physical information'). The processor 1220 may generate internal commands corresponding to a command received from the host 1400 and queue the internal commands in a command queue (not shown). The data set(s) may be stored in the buffer memory 1300 of FIG. 1 or the memory buffer 1230.

The memory buffer 1230 may be used as the working memory, the cache memory or the buffer memory of the processor 1220. The memory buffer 1230 may store codes and commands, which are executed by the processor 1220. The memory buffer 1230 may include a Static RAM (SRAM) or a Dynamic RAM (DRAM). The memory buffer 1230 may store a plurality of internal commands queued by the processor 1220, and store a plurality of command sets generated by the processor 1220.

The flash control circuit 1240 may generate and output a flash command for controlling the memory device 1100 in response to the plurality of queued internal commands. For example, the flash control circuit 1240 generates and outputs a flash command for controlling a write operation of the memory device 1100 in response to internal commands corresponding to the write operation. The flash control circuit 1240 may transmit at least one data set buffered in the memory buffer 1230 or the buffer memory 1300 of FIG. 1 to the memory device 1100. The flash control circuit 1240 may control the memory device 1100 such that the at least one data set is to be preferentially stored in the SLC buffer SLC_BF of FIG. 2. The flash control circuit 1240 may control the memory device 1100 such that the data sets stored in the SLC buffer SLC_BF are stored in a corresponding name space among the plurality of name spaces NS_0 to NS_K of the memory device 1100.

The name space management circuit 1250 may distinguish data sets stored in the SLC buffer SLC_BF of the memory device 1100 for each name space according to ID information of a name space, which is included in each of the data sets. Also, the name space management circuit 1250 may distinguish valid data counts of data included in the data sets for each name space and manage the distinguished valid data counts. The valid data count may include a number of data programmed in actual memory cells among the data included in the data set. For example, the name space management circuit 1250 may distinguish valid data counts respectively corresponding to a plurality of name spaces and manage the distinguished valid data counts. The name space management circuit 1250 may determine a number of open blocks of the memory device 1100 in a program operation, based on a number of name spaces corresponding to data sets stored in the SLC buffer SLC_BF and a valid data count corresponding to each name space. For example, when the number of name spaces corresponding to the data sets stored in the SLC buffer SLC_BF is one, the memory device 1100 may be controlled to perform a program operation by selecting one open block. In addition, when the number of name spaces corresponding to the data sets stored in the SLC buffer SLC_BF is two or more, and the number of name spaces of which valid data counts are equal to or greater than a set value among the two or more name spaces is two or more, the memory device 1100 may be controlled to perform a program operation by selecting two or more open blocks. The memory device 1100 may be controlled to program, in different open blocks, data sets corresponding to the name spaces of which valid data counts are equal to or greater than the set value.

Thus, when data sets stored in the SLC buffer SLC_BF are stored in at least two name spaces, at least two open blocks are selected according to valid data counts, so that data sets having different data characteristics may be stored in different open blocks. That is, data sets corresponding to two or more name spaces may be prevented from being programmed together in one open block. Accordingly, the read performance of the memory system may be improved, and an unnecessary garbage collection operation may be prevented.

In an example, the name space management circuit 1250 may store a valid data count corresponding to each name space and manage the stored valid data counts.

In an example, the name space management circuit 1250 may be included as a component within the processor 1220, or be included as a component within the flash control circuit 1240.

The host interface 1260 may be configured to communicate with the host 1400 of FIG. 1 under the control of the processor 1220. The host interface 1260 may be configured to communicate with the host 1400, using at least one of various communication protocols, such as a Universal Serial Bus (USB), a Serial AT Attachment (SATA), a High Speed InterChip (HSIC), a Small Computer System Interface (SCSI), Firewire, a Peripheral Component Interconnection (PCI), a PCI express (PCIe), a Nonvolatile Memory Express (NVMe), a Universal Flash Storage (UFS), a Secure Digital (SD), a MultiMedia Card (MMC), an Embedded MMC (eMMC), a Dual In-line Memory Module (DIMM), a Registered DIMM (RDIMM), and a Load Reduced DIMM (LRDIMM).

The buffer control circuit 1270 may be configured to control the memory buffer 1230 under the control of the processor 1220.

The buffer memory interface 1280 may be configured to communicate with the buffer memory 1300 of FIG. 1 under the control of the processor 1220. The buffer memory interface 1280 may communicate a command, an address, and data with the buffer memory 1300 through a channel.

The error correction circuit 1290 may perform error correction. The error correction circuit 1290 may perform ECC (error correction code) encoding on data to be written in the memory device 1100 of FIG. through the flash interface 1310. The ECC-encoded data may be transferred to the memory device 1100 through the flash interface 1310. The error correction circuit 1290 may perform ECC decoding on data received from the memory device 1100 through the flash interface 1310. In an example, the error correction circuit 1290 may be included in the flash interface 1310.

The flash interface 1310 may be configured to communicate with the memory device 1100 of FIG. 1 under the control of the processor 1220. The flash interface 1310 may communicate command control signals, an address, and data with the memory device 1100 through a channel. When an operation of the memory device 1100 is successfully performed or when the operation fails due to the occurrence of an error, the flash interface 1310 may receive a report signal indicating that the operation has been successfully performed or that the operation has failed.

In an embodiment of the present disclosure, it is illustrated that ID information of name spaces is included in meta data included in data sets, and the memory device 1100 is controlled to distinguish the data sets for each name space, based on the meta data, and program the distinguished data sets. However, the present disclosure is not limited thereto, and the memory device 1100 may be controlled to distinguish meta pages in which physical information is stored, based on name space IDs, distinguish data sets for each name space, based on the distinguished meta pages, and program the distinguished data sets.

Figure 4:
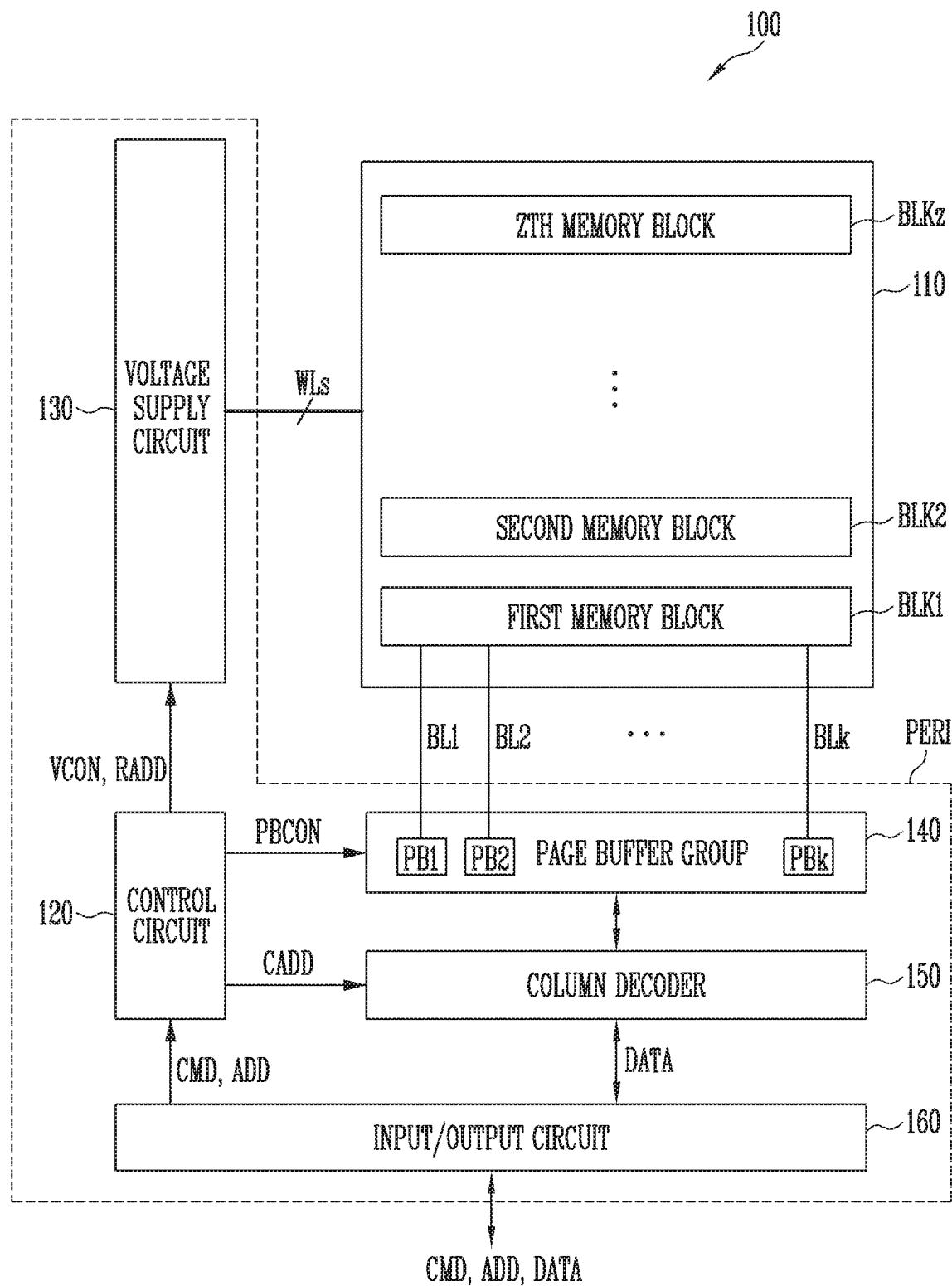
FIG. 4 is a block diagram illustrating a semiconductor memory according to an embodiment of the present disclosure.

FIG. 4 is a block diagram illustrating a semiconductor memory, e.g., the semiconductor memory 100 of FIG. 1, according to an embodiment of the present disclosure.

Referring to FIG. 4, the semiconductor memory 100 may include a memory cell array 110 and a peripheral circuit PERI. The peripheral circuit PERI may be configured to perform a program, read or erase operation of memory cells included in a selected page of the plurality of memory blocks BLK1 to BLKz. The peripheral circuit PERI may include a control circuit 120, a voltage supply circuit 130, a page buffer group 140, a column decoder 150, and an input and output (input/output) circuit 160.

The memory cell array 110 may include a plurality of memory blocks BLK1 to BLKz. Each of the plurality of memory blocks BLK1 to BLKz may include a plurality of pages. Each of the plurality of pages may include a plurality of memory cells. In an embodiment, the plurality of memory cells may be nonvolatile memory cells. This will be described in more detail with reference to FIGS. 5 and 6.

The control circuit 120 may output a voltage control signal VCON for generating a voltage required to perform a read, program or erase operation in response to a flash command CMD received through the input/output circuit 160. The control circuit 120 may output a PB control signal PBCON for controlling page buffers PB1 to PBk included in the page buffer group 140 according to the kind of operation. The control circuit 120 may output a row address signal RADD and a column address signal CADD in response to an address signal ADD received from another device (e.g., the controller 1200 of FIG. 1) through the input/output circuit 160.

The voltage supply circuit 130 may supply operating voltages required to perform program, read, and erase operations of memory cells in the memory cell array 110 in response to the voltage control signal VCON of the control circuit 120 to local lines including a drain select line, word lines WLs, and a source select line of a selected memory block. The voltage supply circuit 130 may include a voltage generating circuit and a row decoder.

The voltage generating circuit may output operating voltages required to perform program, read, and erase operations of memory cells in the memory cell array 110 to global lines in response to the voltage control signal VCON of the control circuit 120.

The row decoder may couple between the global lines and the local lines such that the operating voltages output to the global lines by the voltage generating circuit may be transferred to the local lines of the selected memory block in the memory cell array 110.

The page buffer group 140 may include a plurality of page buffers PB1 to PBk coupled to the memory cell array 110 respectively through bit lines BL1 to BLk. The page buffers PB1 to PBk may selectively precharge the bit lines BL1 to BLk according to input data DATA from the input/output circuit 160 so as to store the data DATA in the memory cells in response to the PB control signal PBCON of the control circuit 120, or may sense voltages of the bit lines BL1 to BLk so as to read the data DATA from the memory cells.

The column decoder 150 may select at least one of the page buffers PB1 to PBk in the page buffer group 140 in response to the column address signal CADD output from the control circuit 120. That is, the column decoder 150 may sequentially transfer data DATA to be stored in the memory cells to the page buffers PB1 to PBk in response to the column address signal CADD. The column decoder 150 may sequentially select the page buffers PB1 to PBk in response to the column address signal CADD such that data DATA of the memory cells, which are latched on the page buffers PB1 to PBk in a read operation, may be output to another device through the input/output circuit 160.

In a program operation, the input/output circuit 160 may transfer the data DATA to the column decoder 150 under the control of the control circuit 120. The data DATA may be transferred to the page buffer group 140 through the column decoder 150, and may be stored in corresponding memory cells through the page buffer group 140. When the column decoder 150 transfers the data DATA received from the input/output circuit 160 to the page buffers PB1 to PBk of the page buffer group 140, the page buffers PB1 to PBk may store the input data DATA to latch circuits (not shown) therein. In a read operation, the input/output circuit 160 may output, to the outside, the data DATA received from the page buffers PB1 to PBk of the page buffer group 140 through the column decoder 150.

Figure 5:
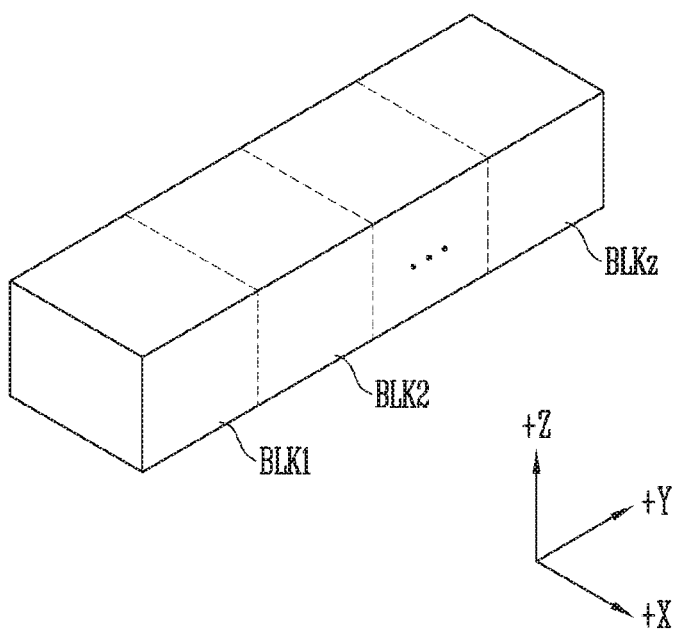
FIG. 5 is a block diagram illustrating a memory cell array according to an embodiment of the present disclosure.

FIG. 5 is a block diagram illustrating a memory cell array, e.g., memory cell array 110 of FIG. 4, according to an embodiment of the present disclosure.

Referring to FIG. 5, the memory cell array 110 may include a plurality of memory blocks BLK1 to BLKz. Each memory block has a three-dimensional structure. Each memory block may include a plurality of memory cells stacked above a substrate. The plurality of memory cells may be arranged along +X, +Y, and +Z directions. The structure of each memory block will be described in more detail with reference to FIG. 6.

In a program operation, at least one memory block among the plurality of memory blocks BLK1 to BLKz may be selected as an open block, so that the program operation may be performed.

Figure 6:
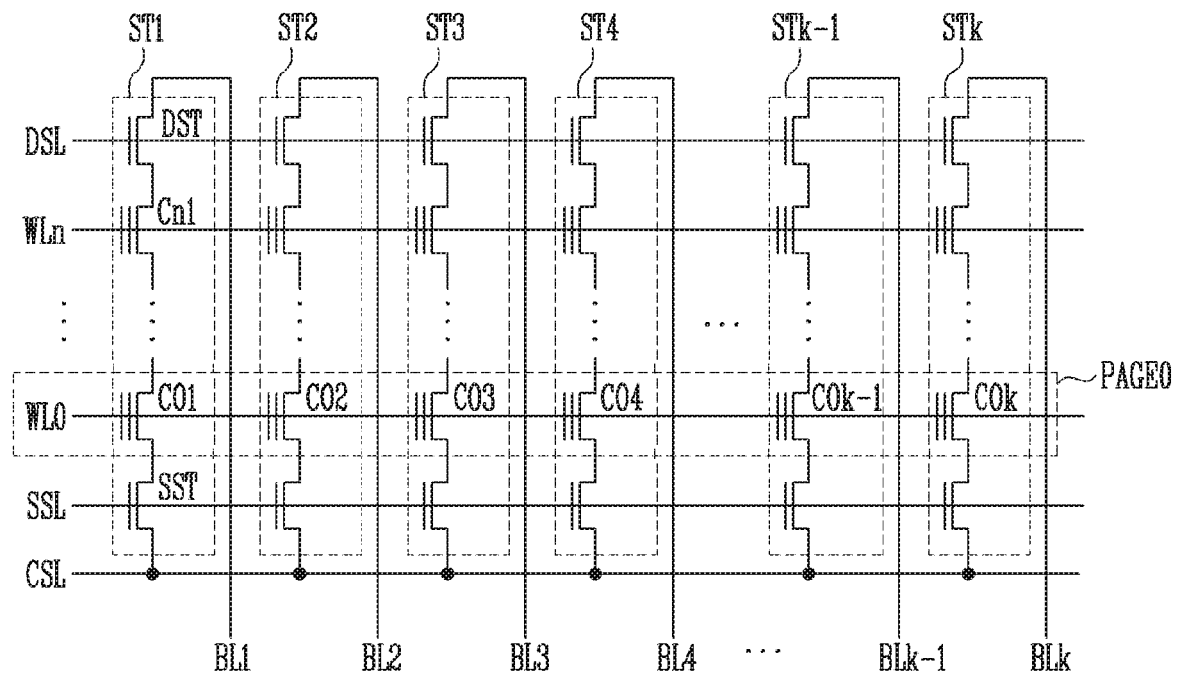
FIG. 6 is a circuit diagram illustrating a memory block according to an embodiment of the present disclosure.

FIG. 6 is a circuit diagram illustrating a memory block, e.g., one memory block among the memory blocks BLK1 to BLKz shown in FIG. 5, according to an embodiment of the present disclosure.

Referring to FIG. 6, each memory block may include a plurality of strings ST1 to STk coupled between bit lines BL1 to BLk and a common source line CSL. That is, the strings ST1 to STk may be coupled to corresponding bit lines BL1 to BLk, respectively, and may be commonly coupled to the common source line CSL. Each of string ST1 to STk may include a source select transistor SST having a source coupled to the common source line CSL, a plurality of memory cells C01 to Cn1, and a drain select transistor DST having a drain coupled to the bit line BL1. The memory cells C01 to Cn1 may be coupled in series between the select transistors SST and DST. A gate of the source select transistor SST may be coupled to a source select line SSL. Gates of the memory cells C01 to Cn1 may be coupled to word lines WL0 to WLn, respectively. A gate of the drain select transistor DST may be coupled to a drain select line DSL.

Memory cells in a memory block may be divided in units of physical pages or logical pages. For example, the memory cells C01 to C0k coupled to one word line (e.g., WL0) may constitute one physical page PAGE0. Such a page may be a basic unit of the program operation or the read operation.

Figure 7:
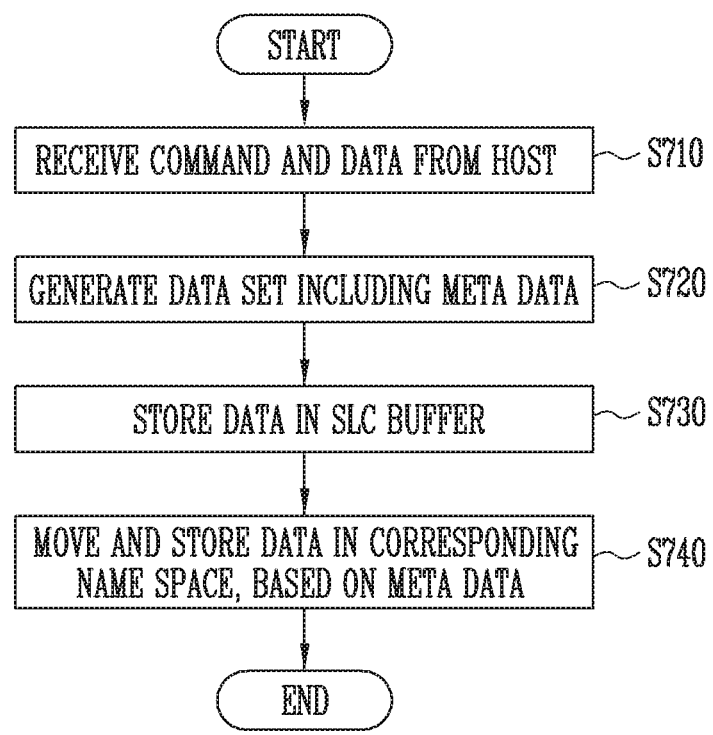
FIG. 7 is a flowchart illustrating an operating method of a memory system according to an embodiment of the present disclosure.

FIG. 7 is a flowchart illustrating an operating method of a memory system according to an embodiment of the present disclosure.

Figure 8:
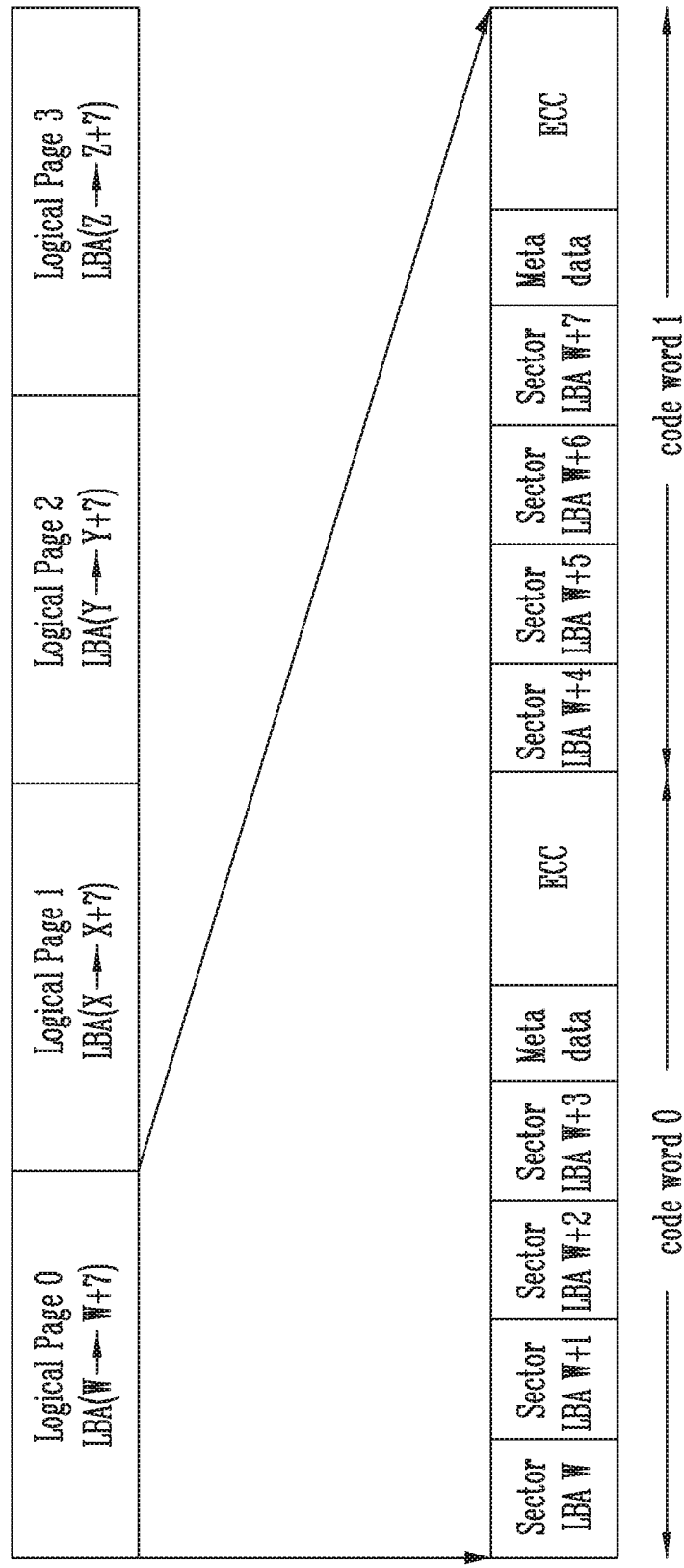
FIG. 8 is a diagram illustrating a structure of a data set according to an embodiment of the present disclosure.

FIG. 8 is a diagram illustrating a structure of a data set according to an embodiment of the present disclosure.

The operating method of the memory system according to an embodiment of the present disclosure will be described as follows with reference to FIGS. 1 to 8.

Referring to FIG. 7, when a write command and a plurality of data are received from the host 1400 (S710), the processor 1220 of the controller 1200 may generate and queue internal commands corresponding to the received write command.

Also, the processor 1220 may generate at least data set, using an address received together with the write command and the plurality of data (S720). Each data set may include meta data including map data and identity (ID) information of a name space corresponding to the data set.

Referring to FIG. 8, the data set may include a plurality of logical pages Logical Page 0 to Logical Page 3. Each logical page may correspond to an area distinguished based on LBAs of the memory device 1100. For example, the logical page Logical Page 0 may correspond to an area having LBAs (W to W+7), the logical page Logical Page 1 may correspond to an area having LBAs of (X to X+7), the logical page Logical Page 2 may correspond to an area having LBAs of (Y to Y+7), and the logical page Logical Page 3 may correspond to an area having LBAs of (Z to Z+7). Each of the areas LBAs (W to W+7), LBAs (X to X+7), LBAs (Y to Y+7), and LBAs (Z to Z+7) may correspond to one name space area.

In various embodiments, one logical page may include at least one code word area. For example, the logical page Logical Page 0 may include areas for two code words, for example, a code word 0 and a code word 1. The code word 0 may include a plurality of sectors Sector LBA W to Sector LBA W+3, meta data Meta data, and error correction code (ECC) data. The code word 1 may include a plurality of sectors Sector LBA W+4 to Sector LBA W+7, meta data Meta data, and ECC data. That is, one code word may be configured to include user data defined with a plurality of sectors, meta data and data related to ECC. Meta data may include map data of the user data and ID information of a name space corresponding to each data set.

The data sets may be stored in the buffer memory 1300 of FIG. 1 or the memory buffer 1230.

Referring again to FIG. 7, the flash control circuit 1240 may control the memory device 1100 such that the data sets stored in the buffer memory 1300 or the memory buffer 1230 are stored in the SLC buffer SLC_BF of the memory device 1100 (S730). For example, the flash control circuit 1240 may generate and output a flash command for controlling a write operation of the memory device 1100 in response to an internal command corresponding to the write operation. The flash control circuit 1240 may control the memory device 1100 to store at least one data set buffered in the memory buffer 1230 or the buffer memory 1300 in the SLC buffer SLC_BF of the memory device 1100.

Subsequently, the flash control circuit 1240 may control the memory device 1100 such that each of the data sets stored in the SLC buffer SLC_BF of the memory device 1100 is moved and stored in a corresponding name space among a plurality of name spaces (e.g., Namespace 0 NS_0 to Namespace K NS_K), based on meta data included in the data sets (S740).

The name space management circuit 1250 may distinguish the data sets stored in the SLC buffer SLC_BF of the memory device 1100 for each name space, based on ID information of a name space included in each of the data sets. Also, the name space management circuit 1250 may control the memory device 1100 such that data included in the data sets are stored in the name spaces by determining a number of open blocks of the memory device 1100 according to valid data counts of the data.

FIG. 9 is a diagram illustrating an operation of programming a data set from a buffer (e.g., an SLC buffer) to an open block in a memory system according to an embodiment of the present disclosure.

The above-described step S740 of FIG. 7 will be described in more detail with reference to FIG. 9.

When the number of name spaces corresponding to the data sets (e.g., first to fourth data sets) stored in the SLC buffer SLC_BF is one, i.e., when the data sets stored in the SLC buffer SLC_BF correspond to the same name space, a program operation may be performed on the first to fourth data sets by selecting one open block as shown in (a) of FIG. 9.

When the number of name spaces corresponding to the data sets (e.g., the first to fourth data sets) stored in the SLC buffer SLC_BF is two or more, and the number of name spaces of which valid data counts is greater than or equal to a set value, a program operation may be performed on the first to fourth data sets by selecting two or more open blocks. For example, as shown in (b) of FIG. 9, when the first and third data sets among the first to fourth data sets correspond to one name space (e.g., a first name space), the second and fourth data sets among the first to fourth data sets correspond to another name space (e.g., a second name space), and valid data counts of the first and third data sets are greater than or equal to the set value, a program operation may be performed on the first and third data sets by selecting one open block (e.g., a 1st open block) in the first name space. In addition, when valid data counts of the second and fourth data sets are greater than or equal to the set value, a program operation may be performed on the second and fourth data sets by selecting one open block (e.g., a 2nd open block) in the second name space.

Thus, when data sets stored in the SLC buffer SLC_BF are stored in at least two name spaces, at least two open blocks are selected according to valid data counts, so that data sets having different data characteristics may be stored in different open blocks. That is, data sets corresponding to two or more name spaces may be prevented from being programmed together in one open block. Accordingly, the read performance of the memory system may be improved, and an unnecessary garbage collection operation may be prevented.

Figure 10:
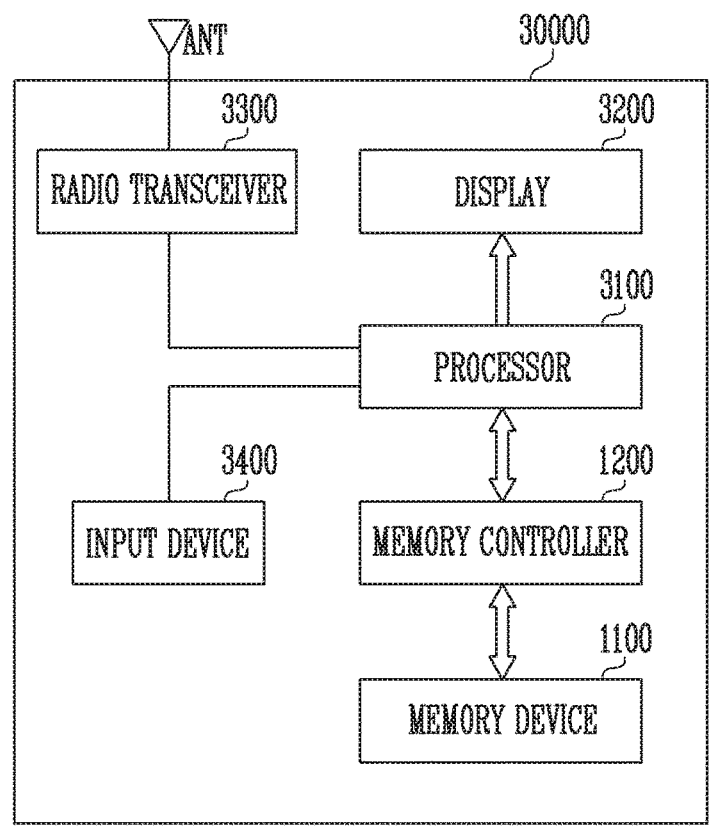
FIG. 10 is a diagram illustrating a memory system according to another embodiment of the present disclosure.

FIG. 10 is a diagram illustrating a memory system according to another embodiment of the present disclosure.

Referring to FIG. 10, memory system 30000 may be implemented as a cellular phone, a smart phone, a tablet personal computer (PC), a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100. The name space management circuit 1250 of FIG. 3 may be included as a component of the processor 3100.

Data programmed in the memory device 1100 may be output through a display 3200 under the control of the memory controller 1200.

A radio transceiver 3300 may transmit and receive radio signals through an antenna ANT. For example, the radio transceiver 3300 may convert a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may convert a signal output from the processor 3100 into a radio signal, and output the converted radio signal to an external device through the antenna ANT. An input device 3400 is capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 may be output through the display 3200.

In some embodiments, the memory controller 1200 capable of controlling an operation of the memory device 1100 may be implemented as a part of the processor 3100, or be implemented as a chip separate from the processor 3100. Also, the memory controller 1200 may be implemented with the controller shown in FIG. 3.

Figure 11:
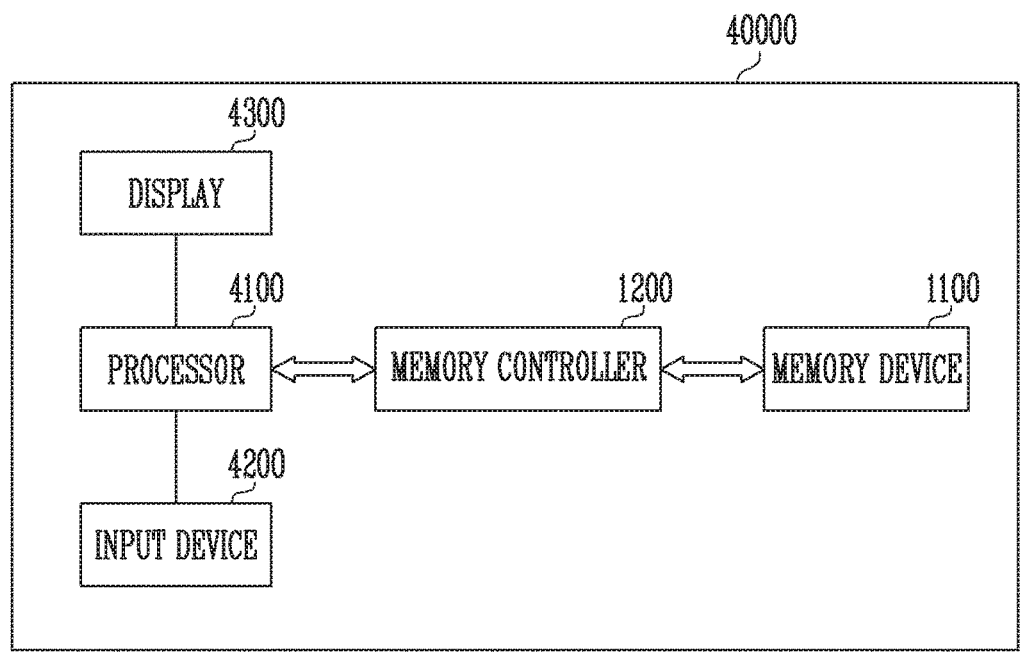
FIG. 11 is a diagram illustrating a memory system according to another embodiment of the present disclosure.

FIG. 11 is a diagram illustrating a memory system according to another embodiment of the present disclosure.

Referring to FIG. 11, memory system 40000 may be implemented as a personal computer (PC), a tablet PC, a net-book, an e-reader, a personal digital assistant (PDA), a portable media or multi-media player (PMP), an MP3 player, or an MP4 player.

The memory system 40000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the memory device 1100 may be implemented as a part of the processor 4100, or be implemented as a chip separate from the processor 4100. Also, the memory controller 1200 may be implemented with the controller shown in FIG. 3. In addition, the name space management circuit 1250 of FIG. 3 may be included as a component of the processor 4100.

Figure 12:
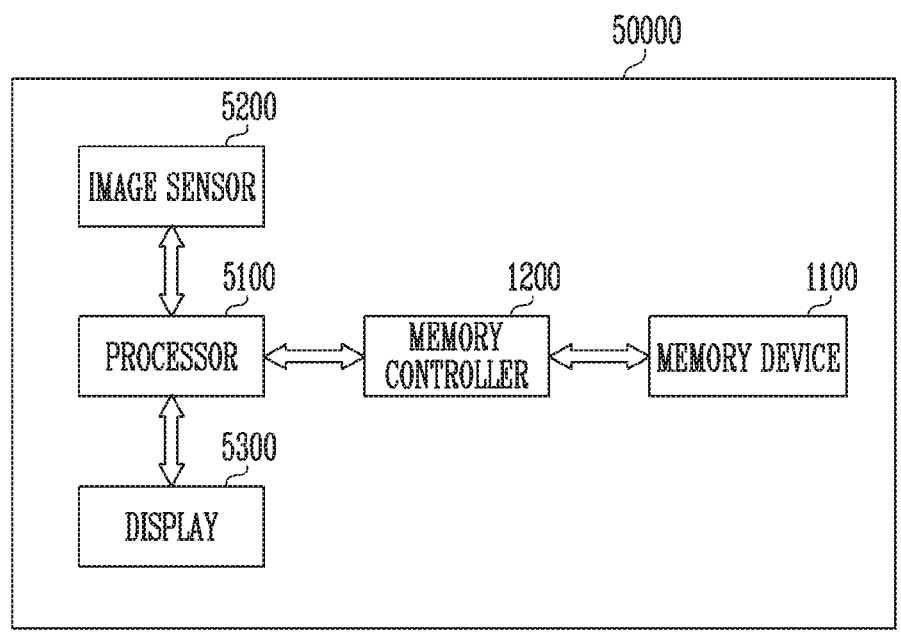
FIG. 12 is a diagram illustrating a memory system according to another embodiment of the present disclosure.

FIG. 12 is a diagram illustrating a memory system according to another embodiment of the present disclosure.

Referring to FIG. 12, memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals. The converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100. Also, the memory controller 1200 may be implemented with the controller shown in FIG. 3. In addition, the name space management circuit 1250 of FIG. 3 may be included as a component of the processor 5100.

Figure 13:
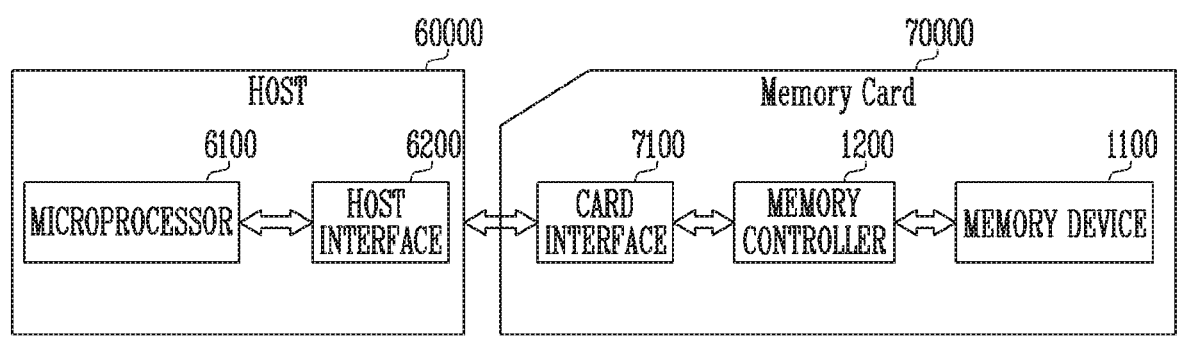
FIG. 13 is a diagram illustrating a memory system according to another embodiment of the present disclosure.

FIG. 13 is a diagram illustrating a memory system according to another embodiment of the present disclosure.

Referring to FIG. 13, memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto. Also, the memory controller 1200 may be implemented with the controller shown in FIG. 3.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is coupled to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor 6100.

According to the present disclosure, when data received from the host are stored in a plurality of name spaces, the data are distinguished using meta data included in data stored in each of the name spaces. Then, the distinguished data are stored in at least two open blocks. Thus, the read performance of the memory system may be improved, and an unnecessary garbage collection operation may be prevented.

Various embodiments have been disclosed herein, and although specific terms are employed, they are used and are to be interpreted in a generic and descriptive sense and not for purpose of limitation. In some instances, as would be apparent to one skilled in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A memory system comprising:
a memory device divided into a plurality of name spaces; and
a controller configured to control a program operation of the memory device in response to a write command,
wherein the controller generates a plurality of data sets,
wherein the controller controls the memory device to convert a plurality of data being input into the plurality of data sets and to program the plurality of data sets into the plurality of name spaces using meta data included in each of the plurality of data sets, and
the controller controls the memory device so that data sets corresponding to a name space in which a count value of valid data to program is greater than or equal to a set value, among the plurality of name spaces, are programmed into different open blocks.

2. The memory system of claim 1, wherein the plurality of name spaces comprise areas obtained by dividing a storage space of the memory device based on Logical Block Addresses (LBAs).

3. The memory system of claim 1, wherein the controller generates the plurality of data sets such that identity (ID) information of the select name space in which the plurality of data sets are to be stored is included in the meta data.

4. The memory system of claim 1, wherein the controller distinguishes each of the plurality of data sets based on identity (ID) information.

5. The memory system of claim 1, wherein the memory device further includes a single buffer configured to temporarily store the plurality of data sets and then move the at least one temporarily stored data set to the select name space.

6. The memory system of claim 1,
wherein the controller controls the count value of the valid data of each of the plurality of name spaces and the count value of the valid data is a sum of valid data included in at least one data set corresponding to one name space.

7. The memory system of claim 1, wherein the controller includes:
a processor configured to generate an internal command in response to the write command, and generate the plurality of data sets in response to the input data and a received address;
a memory buffer configured to temporarily store the plurality of data sets;
a flash control circuit configured to control the memory device in response to the internal command; and
a name space management circuit configured to distinguish the plurality of data sets based on identity (ID) information.

8. The memory system of claim 7, wherein the name space management circuit distinguishes valid data counts of data in the plurality of data sets for each of the plurality of name spaces and manages the distinguished valid data counts.

9. The memory system of claim 8, wherein the name space management circuit determines a number of open blocks of the memory device according to a number of name spaces corresponding to the plurality of data sets and a number of valid data counts corresponding to each name space.

10. The memory system of claim 9, wherein, when the number of name spaces corresponding to the plurality of data sets stored in the single buffer is two or more, and the number of name spaces of which valid data counts are greater than or equal to the set value, the name space management circuit controls the memory device to perform a program operation by selecting the at least two open blocks.

11. The memory system of claim 10, wherein the name space management circuit controls the memory device such that the plurality of data sets of which valid data count is greater than or equal to the set value is programmed in different open blocks.

12. A memory system comprising:
a memory device divided into a plurality of name spaces; and
a controller configured to generate a plurality of data sets based on input data, and control the memory device to store the plurality of data sets in the plurality of name spaces,
wherein the controller controls the memory device to store the plurality of data sets in the plurality of name spaces based on meta data including identity (ID) information associating each of the data sets with one of the name spaces, and
wherein the controller controls the memory device so that data sets corresponding to a name space in which a count value of valid data to program is greater than or equal to a set value, among the plurality of name spaces, are programmed into different open blocks.

13. The memory system of claim 12, wherein the plurality of name spaces comprise areas obtained by dividing a storage space of the memory device, based on logical block addresses (LBAs).

14. The memory system of claim 12, wherein the controller distinguishes the plurality of data sets based on their ID information.

15. The memory system of claim 12, wherein, when the number of name spaces corresponding to the plurality of data sets is two or more, and the number of name spaces of which valid data counts are equal to or greater than a set value, the controller controls the memory device to perform a program operation by selecting the at least two open blocks.

16. A method for operating a memory system, the method comprising:
receiving a write command and a plurality of data from a host;
generating a plurality of data sets based on the plurality of data, wherein each of the plurality of data sets includes meta data;
distinguishing the plurality of data sets with respect to a plurality of name spaces of a memory device using the meta data,
wherein the plurality of data sets distinguished according to the plurality of name spaces are stored in the plurality of name spaces of the memory device, respectively, and data sets corresponding to a name space in which a count value of valid data to program is greater than or equal to a set value, among the plurality of name spaces, are stored in different open blocks.

17. The method of claim 16, wherein the plurality of name spaces comprise areas obtained by dividing a storage space of the memory device, based on logical block addresses (LBAs).

18. The method of claim 16, wherein the meta data of each of the plurality of data sets includes identity (ID) information of a corresponding name space of the plurality of name spaces.

* * * * *